United States Patent Office 3,557,004
Patented Jan. 19, 1971

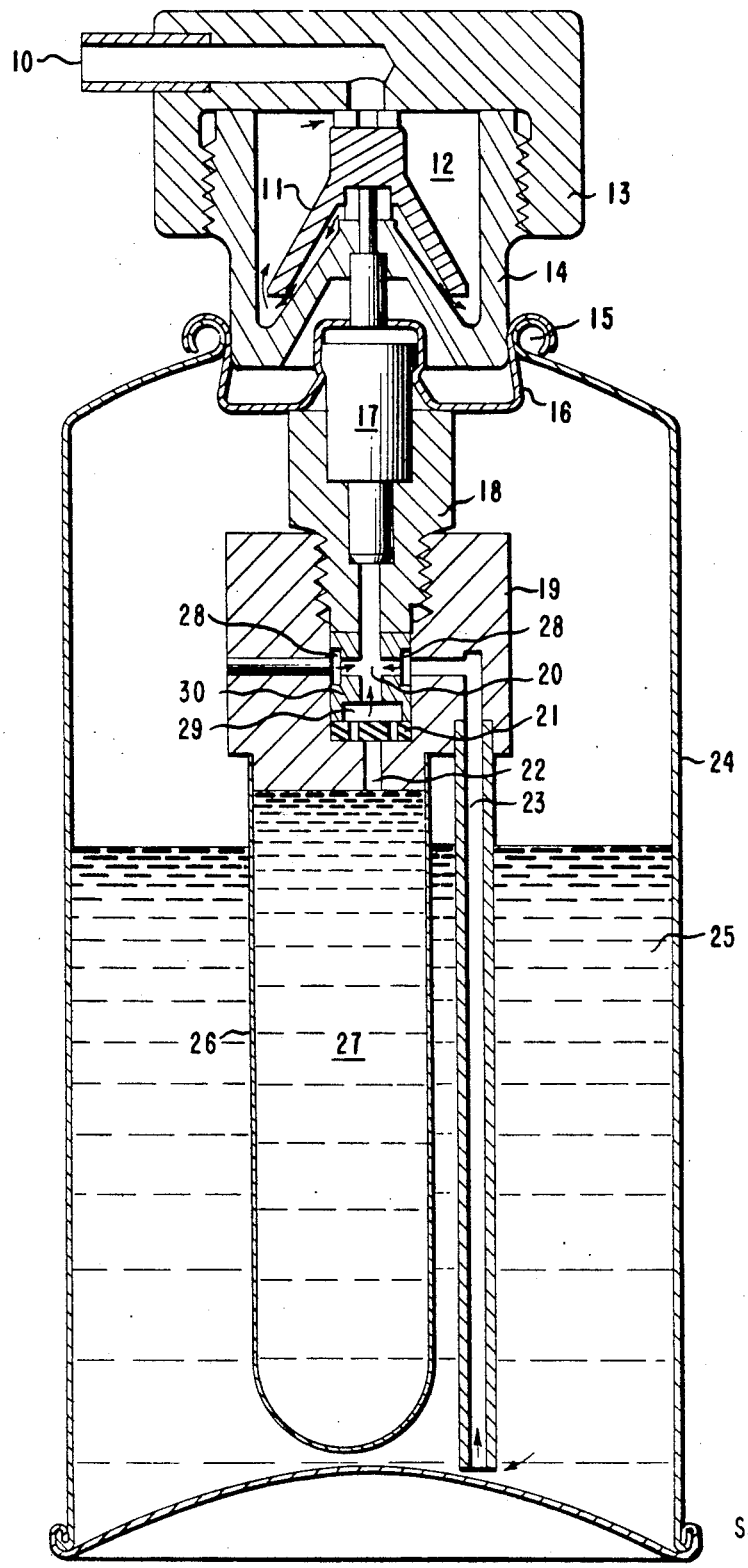

3,557,004
PACKAGE AND PROCESS FOR
PREPARING FOAM
Seymour Yolles, Newark, Del., assignor to E. I. du Pont
de Nemours and Company, Wilmington, Del., a corporation of Delaware
Continuation-in-part of application Ser. No. 612,962, Jan. 31, 1967, which is a continuation-in-part of application Ser. No. 497,593, Oct. 5, 1965, which in turn is a continuation-in-part of application Ser. No. 486,061, Sept. 9, 1965. This application July 24, 1968, Ser. No. 752,125
Int. Cl. C11d 17/00
U.S. Cl. 252—90     2 Claims

ABSTRACT OF THE DISCLOSURE

A foam-dispensing package comprising an aerosol container having a foam outlet and a valve for dispensing foam, and having contained therein a propellant material, an aqueous foamable composition, hydrogen peroxide, and a substance selected from sodium sulfite, potassium sulfite, ammonium sulfite, sodium thiosulfate, potassium thiosulfate, or a mixture of potassium sulfite and potassium thiosulfate, said substance being reactable with hydrogen peroxide to produce heat. Upon discharge of the container, the hydrogen peroxide contacts the substance reactable therewith to produce heat which imparts a warming effect upon the foam produced during the discharge.

CROSS-REFERENCES TO RELATED APPLICATIONS

This application is a continuation-in-part of application Ser. No. 612,962, filed Jan. 31, 1967, which was a continuation-in-part of application Ser. No. 497,593, filed Oct. 5, 1965 and now abandoned, which was a continuation-in-part of application Ser. No. 486,061, filed Sept. 9, 1965, and now abandoned.

BACKGROUND OF THE INVENTION (1) Field of the invention

This invention relates to a package and process for preparing and dispensing warm aqueous foam, and to a foam so prepared.

(2) Description of the prior art

Redox (oxidation-reduction) systems for the generation of heat in pressure-dispensed products, such as shaving lathers, are known in the art. They are preferable to systems involving solely the catalytic decomposition of hydrogen peroxide because such decomposition systems require a large amount of hydrogen peroxide and should the valve of the container malfunction, a strong solution of hydrogen peroxide could be accidentally expelled, or should the hydrogen peroxide decompose too rapidly inside the container, an explosion could result. However, redox systems, at present, possess inherent undesirable features. For example, some contain thioureas which impart an unpleasant odor to the systems; others contain thiobarbituric acids which are expensive.

SUMMARY OF THE INVENTION

The package of this invention comprises a container having a foam outlet and a valve adapted to control the dispensing of foam therefrom, which contains (A) an aqueous dispersion of a foamable composition; (B) hydrogen peroxide; (C) a substance which is reactable at room temperature with the hydrogen peroxide and which is selected from sodium sulfite, potassium sulfite, ammonium sulfite, sodium thiosulfate, potassium thiosulfate, or a mixture of potassium sulfite and potassium thiosulfate; said materials (B) and (C) being isolated from each other when said valve is closed, said package being equipped with conveyor means comprising a duct and a source of fluid pressure selected from a compressed gas or a volatile organic propellant, said source of fluid pressure being present in an amount sufficient to convey material (A) to said outlet and dispense it therefrom as a foam when the valve is open, and means to provide intimate contact between materials (A), (B) and (C) while material (A) is being conveyed toward said outlet.

The process aspect of the invention comprises the process for producing a warm foam in which the materials defined in (A, (B) and (C) are intimately mixed.

The warm foam composition of this invention comprises a warm foam of an intimate mixture of materials (A) (B) and (C) as defined above, said foam having a temperature above ordinary room temperature.

DESCRIPTION OF THE INVENTION

The package aspect of the invention is illustrated in the attached drawing which shows an embodiment of the novel package in central vertical section. The construction and operation of this package are described in detail below in Example 1. However, the container described in the drawing is not a critical aspect of this invention, for any container which maintains the hydrogen peroxide and the substance reactable therewith in separate compartments until discharge of them can be employed. Such containers are described in U.S. Pats. 3,326,416 and 2,973,883.

The term "aqueous dispersion of a foamable composition," referred to above as material (A), herein means an aqueous solution or dispersion of a foam-producing agent capable of forming a foam when discharged from the pressurized container. The best type and concentration of foam-producing agent in the composition for a particular application is readily determined by one skilled in the art and is not critical for purposes of this invention; however, the composition usually contains about 4 to 30% by weight of foam-producing agent. Useful foam-producing agents are exemplified by the soluble anionic soaps, for example the potassium, ammonium and soluble amine soaps of stearic acid, as well as vegetable oil soaps, the various synthetic materials commonly referred to as wetting agents or surfactants, and fibrous alumina monohydrate in combination with a foam coactant. The materials can be used either individually or in combination. The use of the fibrous alumina/foam coactant combination in producing aqueous foams is described in U.S. patent application Ser. No. 692,730, filed Dec. 22, 1967 by E. P. Moore. The foamable composition (A) is non-gelling at the temperature of the room or other locale in which the package is to be used. The foamable composition can also contain additives known in the art; for example, glycerine, light mineral oil, perfume, anti-freeze agents, silicone fluids and viscosity-controlling agents. The invention is particularly adaptable for use with foamable compositions which produce shaving lather.

Of the substances reactable with the hydrogen peroxide at room temperature, i.e., material (C), the preferred substances are potassium sulfite or a mixture of potassium sulfite and potassium thiosulfate. The latter, upon mixing with $H_2O_2$ and soap solution forms a foam having good heat retention. The mole ratio of potassium thiosulfate to potassium sulfite is not critical; however, for good results the ratio should be about 0.4 to about 0.9. Furthermore, for good results the amount of mixture present in admixture with material (A) in the container should range from 5% to 8% by weight. When material (C) is other than the mixture described above, good results are obtained when material (C) is present in admixture with material (A) in the container in amounts of 3% or more.

In general, the dispersing ducts of the container are adjusted so that an excess of material (C)—up to about 20%—is combined with the hydrogen peroxide in order to avoid the possibility of an excess amount of hydrogen peroxide being discharged into the foamed composition.

The package of this invention is constructed so that when the dispensing valve is open, enough of the hydrogen peroxide (preferably a 10 wt. percent or less solution of hydrogen peroxide in water) is brought into contact with a portion of foamable composition (A) and the material (C) to bring about the desired rise in the temperature of the foam-forming mixture.

Preferably the hydrogen peroxide is stored in a separate chamber out of contact with the foamable composition. The substance that is reactable with the hydrogen peroxide (material C) can be dissolved in the foamable composition provided that the latter is substantially free of materials which would react with material (C) to spoil its effectiveness in the heat-producing reaction. Ordinarily the salts employed as material (C) are compatible, and will not gel, with the foamable composition up to a concentration of about 13 percent for the potassium salts and about 7 percent for the sodium salts.

Alternatively, and less preferably, the hydrogen peroxide can be mixed with the foamable composition in the container when the latter is substantially free of materials which would react harmfully with it to make it ineffective for the heat-producing reaction.

The source of fluid pressure for moving the foam-forming mixture to and through the package outlet can be a duct leading from a compressed gas supply into the container or it can be a volatile organic material (referred to in the art as a "propellant") stored within the container. The useful propellants include those known to be operable in an aerosol-type package, for example, isobutane, straight-chain saturated aliphatic hydrocarbons, and water-insoluble chlorine and fluorine substituted hydrocarbons having a vapor pressure of about 15 to 65 p.s.i.g. at 21° C. About 3–25% of propellant is usually required, based on the combined weight of propelant anld foamable composition. After adding the propellant to the chamber containing the foamable composition and before dispensing the foam, the package is preferably shaken briefly to obtain a colloidal dispersion of the propellant in the foamable composition. A preferred propellant is a 40/60 (wt.) mixture of dichlorodifluoromethane and 1,2-dichlorotetrafluoroethane.

As is known to those skilled in the art, the selection of propellants and other materials for use in aerosol packages is made on the basis of such considerations as safety, toxicity and skin reactions of concern in the particular application.

The means to provide intimate contact between materials (A), (B) and (C) while material (A) is flowing towards said outlet can comprise a common duct (see channel 20 of the drawing) into which the materials are fed from their respective storage chambers and in which they become mixed.

The novel package and process are useful in a variety of applications where it is desired to prepare and dispense a warm aqueous foam. The invention is especially useful for preparing warm aqueous foam or lather for such applications as conditioning areas of a person to be shaved, and washing the hands, face or hair. Such utility is particularly beneficial to campers, yachtsmen, and others who often do not have ready access to hot water. Use of the novel package makes shaving fast, easy and comfortable.

The novel package and process are adapted for preparing warm foam quickly, efficiently and without a source of electricity, steam or hot water, and with no awkward attachments.

The examples which follow are given for the purpose of illustrating the invention. All quantities shown are on a weight basis unless otherwise indicated.

EXAMPLE 1

Referring to FIG. 1 of the drawing, the package shown comprises a metallic pressure-proof container or can 24; the can is of a type commonly used in aerosol foam dispensers. The upper portion of the can is rounded and tapered to form a circular opening surrounded by a rolled bead 15 spun from the metal of the can. The rolled edge of cover 16 tightly engages bead 15, and after inserting the contents of the can, is crimped therewith to form a pressure-proof seal.

The central dome-shaped portion of cover 16 is in clamping telescopic engagement with the casing of valve 17 (shown in front view), a type of self-closing valve commonly used in aerosol foam dispensers. Such a valve is shown in FIGS. 1 and 2 of U.S. Pat. 3,245,582 issued Apr. 12, 1966 to Roth et al. This valve is held shut by a compression spring (not shown) within the valve casing. Valve 17 has an upper and a lower hollow stem projectiong from the valve casing. The upper stem, wihch supports cap 13, projects into chamber 12 through a central hole in cover 16 and through a central hole in the dome-shaped bottom wall of cap 13. The lower stem along with the lower portion of the valve casing projects tightly into the central cavity of retainer 18.

The central portion of dome-shaped baffle 11 is clampingly secured between upper and lower diametrically-slotted and centrally-perforated washers. The lower washer permits liquid to flow from the upper stem of valve 17 into chamber 12 beneath baffle 11. The upper washer permits liquid to flow from chamber 12 into the outlet duct 10 in the upper wall of cap 13. The cap 13 is made so that the top portion can be removed by unscrewing it from side wall 14.

Retainer 18 is a plastic cylinder which is cored to receive and fixedly engage the lower portion of valve 17 including the lower stem. The lower porttion of retainer 18 is provided with exterior threads and with a central hole communicating at its top with the hole in the lower valve stem and at its bottom with the central channel 20 of blender 30.

Retainer 19 is a plastic cylinder which is cored to receive valve 21 and blendor 30. The upper portion of the cavity is threaded to fit the threaded portion of retainer 18. A central hole 22 is drilled in the bottom of retainer 19. The lower exterior portion of retainer 19 is rabbetted to permit telescopic engagement with the top portion of cylindrical chamber 26, which is a rubber bag, or, preferably, a film laminate of polyethylene and polyethylene terephthalate. The lower right portion of retainer 19 is provided with a vertical hole communicating with a horizontal hole therein which leads into a groove 28 and the horizontal hole of blender 30. The lower portion of the vertical hole is enlarged to receive the top end of tube 23. The lower end of tube 23 nearly touches the bottom of can 24.

Spool-shaped blender 30 is a plastic cylinder provided at its bottom with a cylindrical cavity or space 29, a central vertical hole or mixing channel 20 communicating with space 29, annular groove 28 communicating with the the horizontal hole of retainer 19, and a horizontal hole opening at both ends into groove 28. The width of grove 28 is slightly greater than the diameter of the horizontal hole of blender 30. Groove 28 provides communication between the horizontal hole of retainer 19 and the horizontal hole of blender 30 even when blender 30 becomes rotated on its axis so that the two holes do not lie in the same vertical plane.

Valve 21 is a flexible rubber disk through which four evenly-spaced holes extend vertically between the center and the edge of the disk. These holes communicate with space 29 but not with hole 22 when valve 17 is closed since the diameter of the solid central portion of valve 21 is greater than the diameter of hole 22.

After valve 21 and blender 30 are positioned in retainer 19 as shown in the drawing, the threaded portions of retainers 18 and 19 are screwed together just tightly enough to provide a liquid-tight seal between the periphery of valve 21 and the underlying cavity floor. The lower ring-shaped portion of blender 30 keeps peripheral portion of valve 21 clamped in sealing engagement with the underlying cavity floor.

The package shown in the drawing was prepared for use by first filling can 24 about two-thirds full with a liquid composition composed of a mixture of 5 parts of sodium sulfite and 95 parts of an aqueous foamable composition having the following formula:

FORMULA 1.1

| | Percent by weight |
|---|---|
| Fibrous boehmite | 4.00 |
| Polyoxyethylene [2] stearyl ether | 2.00 |
| Sorbitol | 10.00 |
| Undecylenyl polypeptidate | 0.08 |
| Sodium lauryl sulfate | 0.12 |
| Water | 83.80 |
| | 100.00 |

The pH value of the composition is adjusted to 6.0 by adding ammonia. The fibrous boehmite (sometimes referred to as fibrous alumina monohydrate) is described in U.S. Pat. 2,915,475; it is composed of fibrils having a length of about 100 millimicrons and a diameter of about 5 millimicrons, and having a specific surface area of about 275 square meters per gram.

The air remaining in the can is replaced with gaseous propellant (the 40/60 mixture described in the next paragraph). After assembling parts 16, 17, 18, 19, 21, 23 and 30 as described above and shown in the drawing, chamber 26 is filled with a 30% aqueous of hydrogen peroxide and attached to retainer 19. The resulting assembly is placed in position in can 24, and the rolled edge of cover 16 is crimped with bead 15 to form a pressure-proof seal.

Propellant is introduced into can 25 by depressing the upper stem of valve 17 (with cap 13 removed) to open the valve and injecting the propellant under pressure through valve 17, from which it flows into the can by way of channel 20, the horizontal hole in parts 30 and 19, and tube 23. Valve 17 is then allowed to close. Valve 21 prevents the propellant from entering chamber 26. The propellant consists of a 40/60 mixture of dichlorodifluoromethane and symmetrical dichlorotetrafluoroethane. The amount injected into the can is equivalent to 10% of the combined weight of aqueous foamable composition, sodium sulfite and propellant (that is, 10% by weight of liquid 25 of the drawing). The upper portion of can 24 contains propellant vapor under pressure sufficient to force liquids 25 and 27 through the duct system provided, including outlet 10, when valve 17 is open.

The top of the cap 13 is then screwed on so that it tightly engages the top of cylindrical wall 14, and the cap is put in its operating position as shown in the drawing in engagement with the upper stem of valve 17. The cap is constructed so that chamber 12 and baffle 11 are omitted and the upper stem of valve 17 opens directly into the foam outlet.

Just prior to use, the package is shaken to insure that the components of liquid 25 are adequately blended with one another. None of liquid 27 can escape from chamber 26 during the shaking because it is sealed in by valve 21.

A quantity of warm, creamy lather is dispensed from the package at outlet 10 by simply pressing down on cap 13. The temperature of the lather as it reaches the outlet is 48° C. When a person applies the lather to the hairy areas of the face and neck by means of his fingers or a brush, the lather comfortably and efficiently prepares these areas for shaving.

While valve 17 is held open by depression of cap 13, the separately stored materials within the package (liquids 25 and 27 and the chamber 12 catalyst) come in contact with one another, and the foamable composition flowing towards the outlet becomes heated to 48° C. in the manner described below.

The liquid 25 mixture of foamable composition, sodium sulfite and propellant flows up through tube 23 into mixing channel 20 by way of the hole in retainer 19, groove 28 and the horizontal hole in blender 30 (see the arrows in the drawing). Simultaneously, the hydrogen peroxide (liquod 27) flows up through hole 22 and into mixing channel 20 (see the arrow in the drawing) by way of (1) a gap created beneath the center portion of valve 21, (2) the four holes in valve 21 and (3) space 29. The gap is created as the upward-rushing pressurized liquid 27 causes the central portion of flexible disk-valve 21 to rise slightly above the cavity floor and thereby provide communication between hole 22 and the four holes in valve 21. The relative size of the ducts carrying the two different liquids into channel 20 is such that the resulting blend has a hydrogen peroxide content of 10.6% (calculated as 100% strength hydrogen peroxide).

The resulting mixture of liquids 25 and 27 flows up through valve 17 whereupon the sodium sulfite begins to react with the hydrogen peroxide to warm the foam-forming mixture. The heated mixture flows in the form of a warm lather through outlet 10.

EXAMPLE 2

A useful warm shaving lather was prepared and dispensed by repeating Example 1 except:

(a) Liquid 27 in chamber 26 is a saturated aqueous solution of sodium sulfite.

(b) Liquid 25 contains hydrogen peroxide; enough 30% hydrogen peroxide is mixed with the foamable composition so that the resulting mixture has a hydrogen peroxide content (100% basis) of 5%.

(c) Liquid 25 is fed into channel 20 at the same rate as liquid 27, thus the resulting blend is a 50/50 mixture of the two liquids.

The temperature of the lather is 45° C. as it flows from the outlet.

EXAMPLE 3

A useful warm shaving lather prepared and dispensed by repeating Example 1 except, (a) The package is prepared for use by first filling can 24 about two-thirds full with a liquid composition having the following formula:

FORMULA 3.1

| | Parts |
|---|---|
| A 60:40 blend of stearic acid and palmitic acid | 7.0 |
| Coconut oil fatty acid | 1.0 |
| Acetylated lanolin | 0.8 |
| Cetyl alcohol | 0.5 |
| Sorbitan monostearate | 0.5 |
| Polyoyethylene sorbitan monostearate | 4.5 |
| Mineral oil | 0.5 |
| Sorbitol, 70% aqueous solution | 3.0 |
| Triethanolamine | 3.5 |
| Potassium sulfite | 9.0 |
| Potassium hydroxide | 1.2 |
| Water | 68.5 |
| | 100.0 |

In preparing Formula 3.1, the first 7 ingredients are mixed together at 70° C. In a separate container, the remaining 5 ingredients are mixed together at 70° C. The latter mixture, while still hot, is added gradually with stirring to the heated mixture of the first 7 ingredients. After heating the resulting Formula 3.1 composition for an additional 10 minutes at 70° C., it is cooled at 21° C. Any suitable known perfume can be added to the composition in an amount sufficient to give it the desired odor.

(b) Chamber 26 is filled with 7% hydrogen peroxide before it is attached to retainer 19.

(c) The propellant is introduced into the can in an amount equal to 8.5% of the combined weight of the Formula 3.1 composition and the propellant.

(d) While the liquid mixture flows from channel 20 to outlet 10, the potassium sulfite reacts very rapidly with the hydrogen peroxide. This exothermic decomposition reaction rapidly heats the latherforming mixture.

The temperature of the dispensed lather is 55° C.

EXAMPLES 4–10

In Examples 4–10, the following soap formulation was prepared in two parts, here designated A and B (percent compositions are based on the total composition comprising parts A and B).

Part A

A mixture consisting of:

| | Percent |
|---|---|
| Acetylated lanolin [1] | 0.8 |
| Cetyl alcohol | 0.5 |
| Sorbitol monostearate [2] | 0.5 |
| Mineral oil | 0.5 |
| Polyoxyethylene sorbitan monostearate [3] | 4.5 |
| Sorbitol (alternatively added to part B), 70 wt. percent in water [4] | 3.0 |

[1] "Modulan," American Cholesterol Products Co., Edison, N.J.
[2] "Aracel" 60, Atlas Chemical Industries, Wilmington, Del.
[3] "Tween" 60, Atlas Chemical Industries, Wilmington, Del.
[4] "Sorbo" 70, Atlas Chemical Industries, Wilmington, Del.

was heated with stirring to 50° C. When all components were melted, lauric acid (1%) was added. With continued stirring and while heating to 70° C., stearic acid (7.0%) was sifted into the mixture. When the mixture was homogeneous it was allowed to cool. At about 50° C. perfume (0.4%), according to preference, was added and mixed.

The mixture could at this stage be stored at room temperature until needed but had to be rewarmed before blending with part B. Part B contains the substance described as material (C) in this invention and is prepared as follows:

Part B

Deionized water was heated to 50° C. and reductants (material C having the wt. percent described in the Examples 4–10 below)[1] potassium hydroxide (1.2%) and triethanolamine (3.5%) were dissolved in the water Part A at 50–55° C. was added to part B, also at about 50–55° C., preferably below the surface, with mild stirring to prevent excessive foaming. The mixture was allowed to cool.

The pH of all soap solutions was about 8 before reaction and about 7 after reaction as measured with pH paper.

The hydrogen peroxide solutions used in the following Examples 4–10 were prepared by dilution with deionized water of commercial 30% hydrogen peroxide containing conventional inhibitors.

In the Examples 4–10, except as otherwise indicated, 20 grams of the above-described soap solutions containing reductant(s) (material C) in weight percent proportions stated in each example were reacted with 5 g. aqueous hydrogen peroxide of the stated weight percent concentration. The 4:1 wt. ratio of the reactant solutions corresponds to the ratio of reactant solutions metered in a common two-compartment dispenser.

The room temperature soap solution was added to a 50 cc. magnetically stirred breaker and a small thermometer was suspended in the solution. After thermometer

[1] The sum of water and reductant(s) in the example is 77.1%.

equilibration, the hydrogen peroxide also at room temperature was added all at once. The temperature of the stirred solution was measured at various time intervals.

The efficiency figures expressed in percent are arrived at by dividing the product of $\Delta T$ (C.°) and the weight in grams of the sum of hydrogen peroxide and soap solution (useful heat, cal.) by the calculated heat of reaction theoretically liberated by the reactants of the experiment in which it is assumed the lather has a heat capacity of one. In an experiment in which non-equivalent amounts of oxidant and reductants were used, the number of reacting moles was taken as equivalent to the number of moles of reactant not in excess.

EXAMPLE 4

A mixture of $K_2SO_3$ (4 wt. percent) in 20 g. soap solution was combined with 5 g. aqueous $H_2O_2$ (3.5 wt. percent). The theoretical equivalent of $H_2O_2$ present, as determined in percent, was 102 percent. In sixty seconds the temperature of the mixture reached a peak increase of 13° C. The resultant percent efficiency of the reaction was 73.3%.

EXAMPLE 5

A mixture of $K_2SO_3$ (9 wt. percent) in 20 g. soap solution was combined with 5 g. aqueous $H_2O_2$ (8 wt. percent). The theoretical equivalent of $H_2O_2$ present, determined in percent, was 103 percent. In ten seconds the temperature of the reaction reached a peak increase of 38° C. The percent efficiency of the reaction was determined to be 95.3%.

EXAMPLE 6

A mixture of $K_2SO_3$ (12.5 wt. percent) in 20 g. soap solution was combined with 5 g. aqueous $H_2O_2$ (10.0 wt. percent). The theoretical equivalent of $H_2O_2$ present, determined in percent, was 93 percent. In less than ten seconds, the temperature of the reaction reached a peak increase of 53°C. The percent efficiency of the reaction was determined to be about 100 percent.

EXAMPLE 7

A mixture of $K_2S_2O_3$ (3.0 wt. percent) in 20 g. soap solution was combined with 5 g. aqueous $H_2O_2$ (8.2 wt. percent). The theoretical equivalent of $H_2O_2$ present, determined in percent, was 95.5 percent. In about 180 seconds a peak temperature increase of about 20° C. was obtained. The efficiency of the reaction was found to be about 53.5 percent.

EXAMPLE 8

A mixture of $K_2S_2O_3$ (4.0 wt. percent) in 20 g. soap solution was combined with 5 g. aqueous $H_2O_2$ (8.2 wt. percent). The theoretical equivalent of $H_2O_2$ present, determined in percent, was about 100 percent. In about 120 seconds, a peak temperature increase of 25° C. was obtained. The efficiency of the reaction was found to be about 66.9 percent.

EXAMPLE 9

A mixture of $K_2S_2O_3$ (3.0 wt. percent) and $K_2SO_3$ (5.0 wt. percent) in 20 g. soap solution was combined with 5 g. aqueous $H_2O_2$ (13 wt. percent). The theoretical equivalent of $H_2O_2$ present, determined in percent, was about 100 percent. In about 30 seconds, a peak temperature increase of 43° C. was observed. The efficiency of the reaction was determined to be 70.2 percent.

EXAMPLE 10

A mixture of $K_2S_2O_3$ (2.0 wt. percent) and $K_2SO_3$ (3.0 wt. percent) in 20 g. soap solution was combined with 5 g. aqueous $H_2O_2$ (8.2 wt. percent). The theoretical equivalent of $H_2O_2$ present, determined in percent, was about 99%. In about 90 seconds, a peak temperature increase of 21° C. was observed. The efficiency of the reaction was determined to be 53.9 percent.

The ingredients employed in Examples 4–10 can be placed in the dispensing container described herein and dispensed so as to mix in the proportion stated in the examples.

The preceding representative examples may be varied within the scope of the present total specification disclosure, as understood and practiced by one skilled in the art, to achieve essentially the same results.

The foregoing detailed description has been given for clearness of understanding only and no unnecessary limitations are be understood therefrom. The invention is not limited to the exact details shown and described, for obvious modifications will occur to those skilled in the art.

The embodiments of the invention in which an exclusive property or privilege is claimed are defined as follows:

1. A package adapted for preparing and dispensing warm foam comprising a container having a foam outlet and a valve adapted to control the dispensing of foam therefrom, which contains
   (A) a dispersion of about 4 percent to about 30 percent by weight of a soluble anionic soap or vegetable oil soap in water
   (B) hydrogen peroxide in an amount of between 3.5 weight percent and 13 weight percent, and
   (C) a mixture of potassium sulfite and potassium thiosulfate in a mole ratio of sulfite to thiosulfate of between about 0.4 to 0.9,
   said materials (B and C) being insolated from each other when said valve is closed,
   said materials (C) being admixed with material (A) in said container in an amount of between about 5 percent to about 8 percent by weight of the admixture,
   said package being equipped with conveyor means comprising a duct and a source of fluid pressure selected from a compressed gas or a volatile organic propellant present in an amount sufficient to convey material (A) to said outlet and dispense it therefrom when said valve is open, and means to provide intimate contact between materials (A), (B) and (C) while material (A) is being conveyed toward said outlet.

2. The package of claim 1 wherein the source of fluid pressure is a volatile organic propellant selected from saturated aliphatic hydrocarbons or water-insoluble chlorine- or fluorine-substituted hydrocarbons.

References Cited

UNITED STATES PATENTS 2,914,374  11/1959  Harris et al. _____ 252—186

JOHN D. WELSH, Primary Examiner

W. E. SCHULZ, Assistant Examiner

U.S. Cl. X.R.

252—95; 424—70